Oct. 23, 1962 A. E. ANDERSON ETAL 3,059,397
VEHICLE BELT DRIVE
Filed Aug. 24, 1960 6 Sheets-Sheet 3
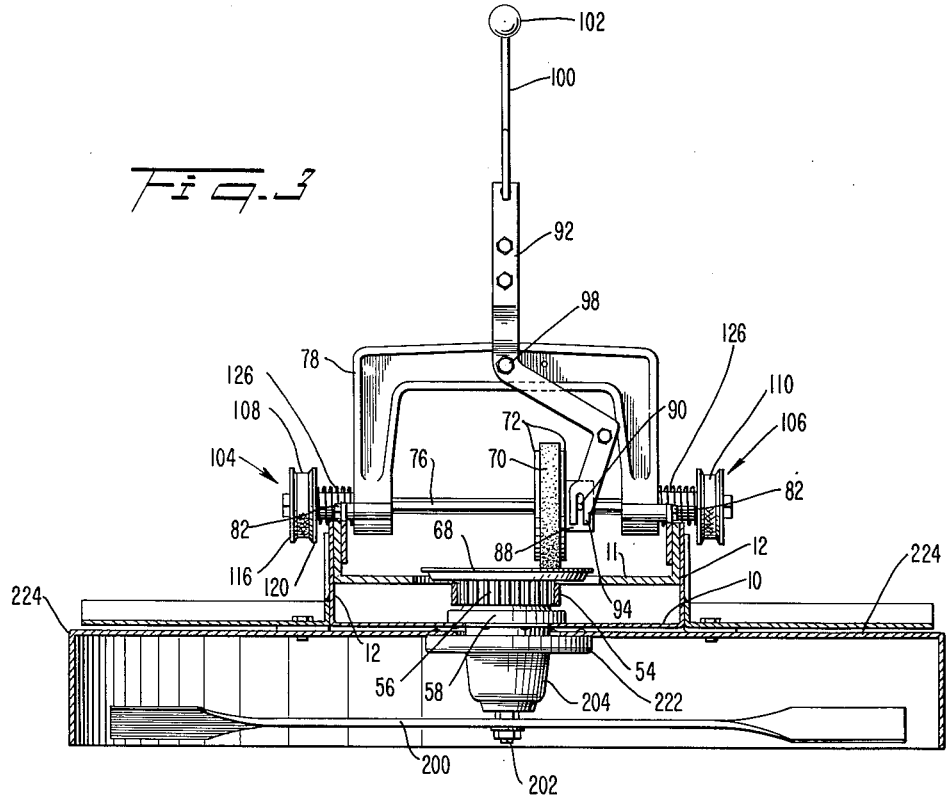
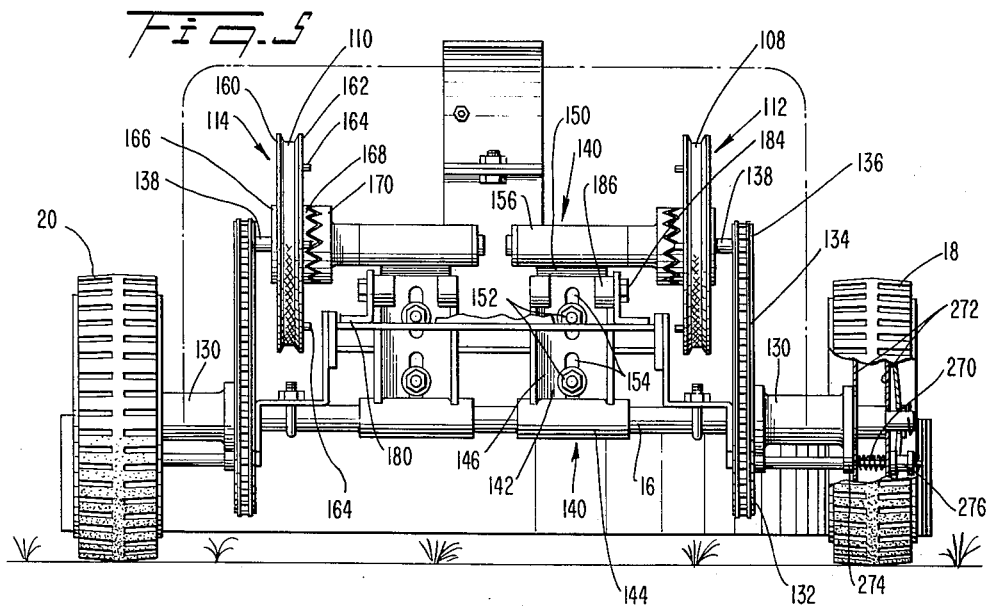

Oct. 23, 1962 A. E. ANDERSON ETAL 3,059,397
VEHICLE BELT DRIVE
Filed Aug. 24, 1960 6 Sheets-Sheet 5
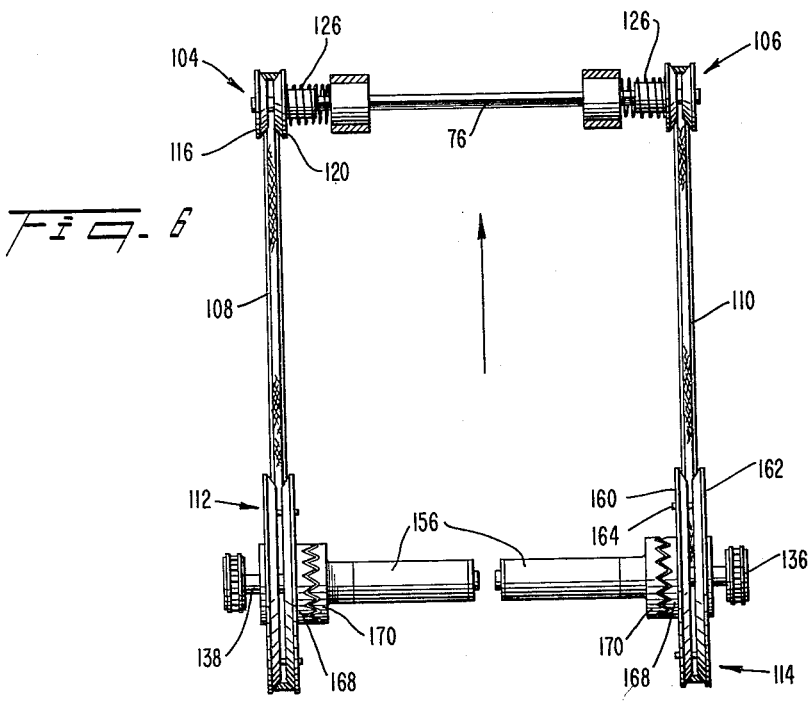
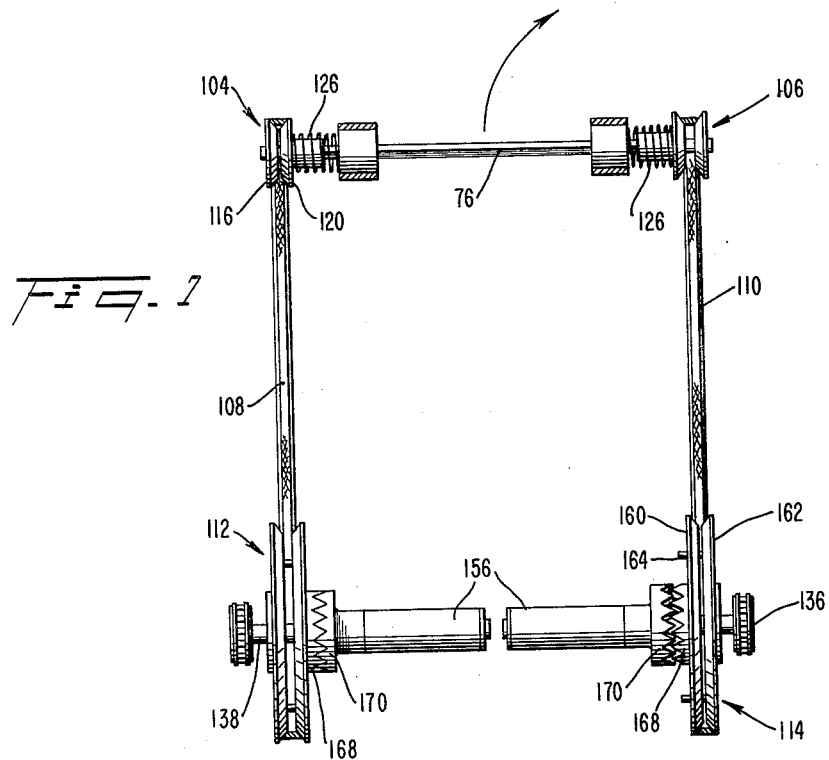

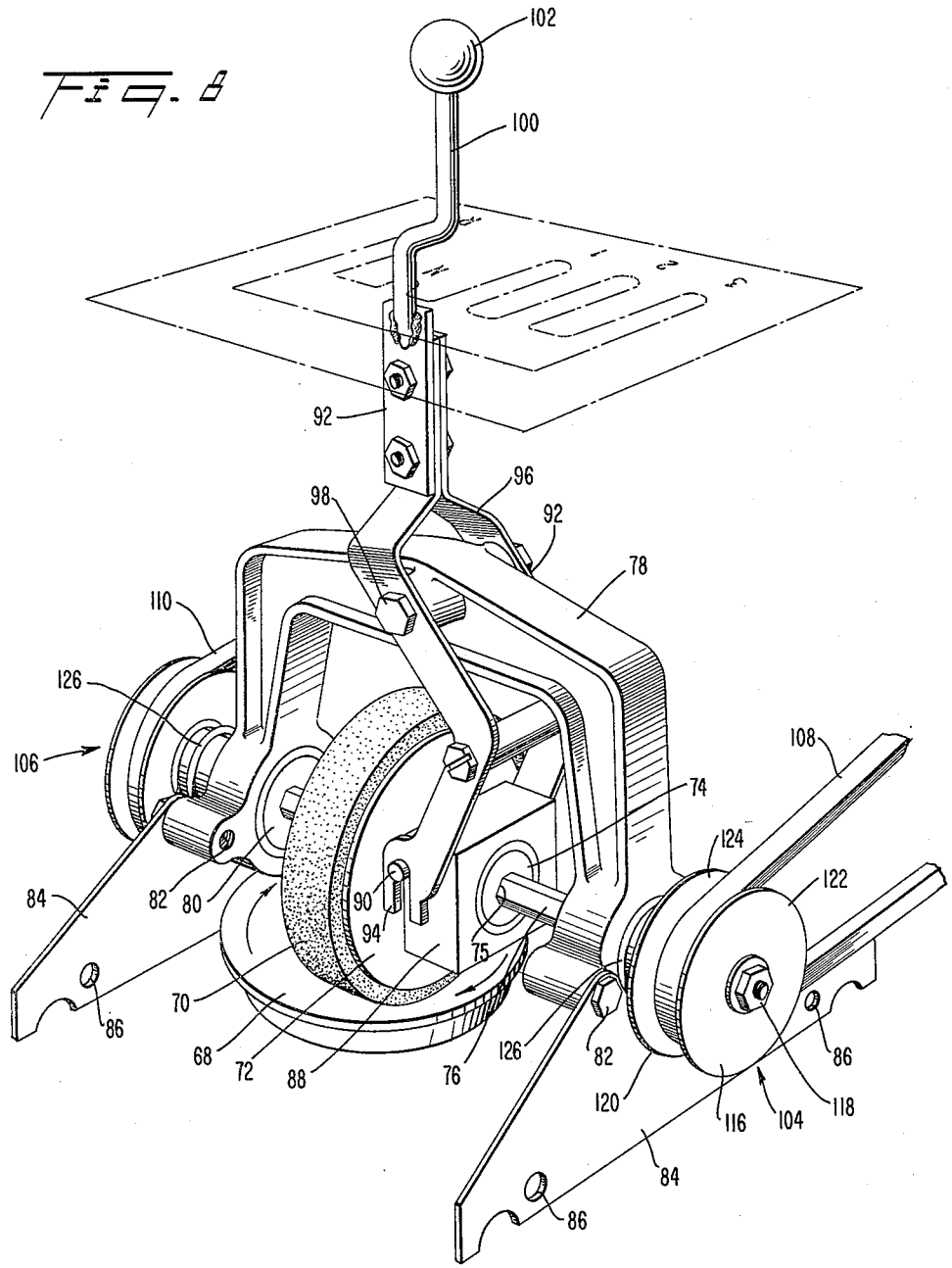

United States Patent Office 3,059,397
Patented Oct. 23, 1962

3,059,397
VEHICLE BELT DRIVE
Albert E. Anderson, Greenwich, and Albert K. Newman, Noroton, Conn., assignors to Homelite, a division of Textron, Inc., Byram, Conn., a corporation of Rhode Island
Filed Aug. 24, 1960, Ser. No. 51,559
17 Claims. (Cl. 56—25.4)

This invention relates to mowing machines and particularly to that type of machine that is self-propelled.

It is an object of this invention to provide simple and effective propelling mechanism permitting steering of the mower while power is applied to the driving wheels in such a manner as to provide differential speeds of the driving wheels when turning while still providing a positive drive for both wheels so that if one driving wheel is on a slippery surface or off the ground because of rough terrain, full power will be available at the other driving wheel.

It is another object of the invention to provide a variable speed transmission for propelling the mower and at the same time providing full speed for the mowing mechanism.

Another object of the invention is to provide a machine of this character which has automatic braking both for the propelling mechanism and the mowing device.

Other objects of the invention are pointed out hereinafter.

The drawings illustrate a preferred embodiment of the invention in which

FIG. 3 is a cross section along the line 3—3 of FIG. 2 looking in the direction of the arrows;

FIG. 5 is a rear view of the machine as indicated by the line 5—5 of FIG. 2 looking in the direction of the arrows;

FIG. 6 is a diagrammatic representation of the drive for propelling a machine, indicating the condition of the pulleys when driving straight ahead;

FIG. 7 is a view similar to FIG. 6 showing the condition of the pulleys when steering the machine to the right;

FIG. 8 is a perspective view of the mounting for the friction drive wheels, its mounting and associated pulleys and controls removed from the machine.

Figure 1:
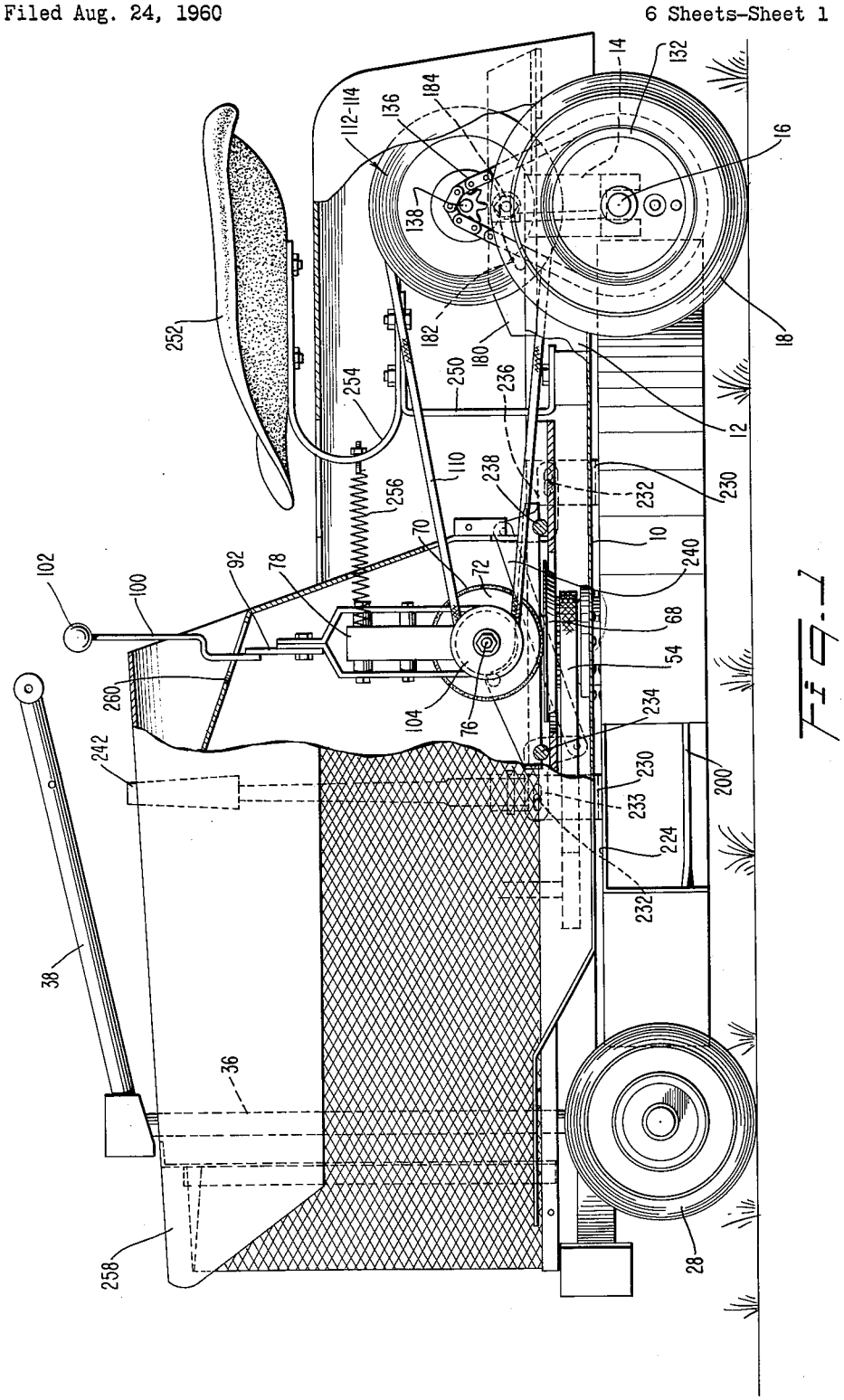
FIG. 1 is a side view of the mowing machine, portions being broken away to show interior mechanism.
Figure 2:
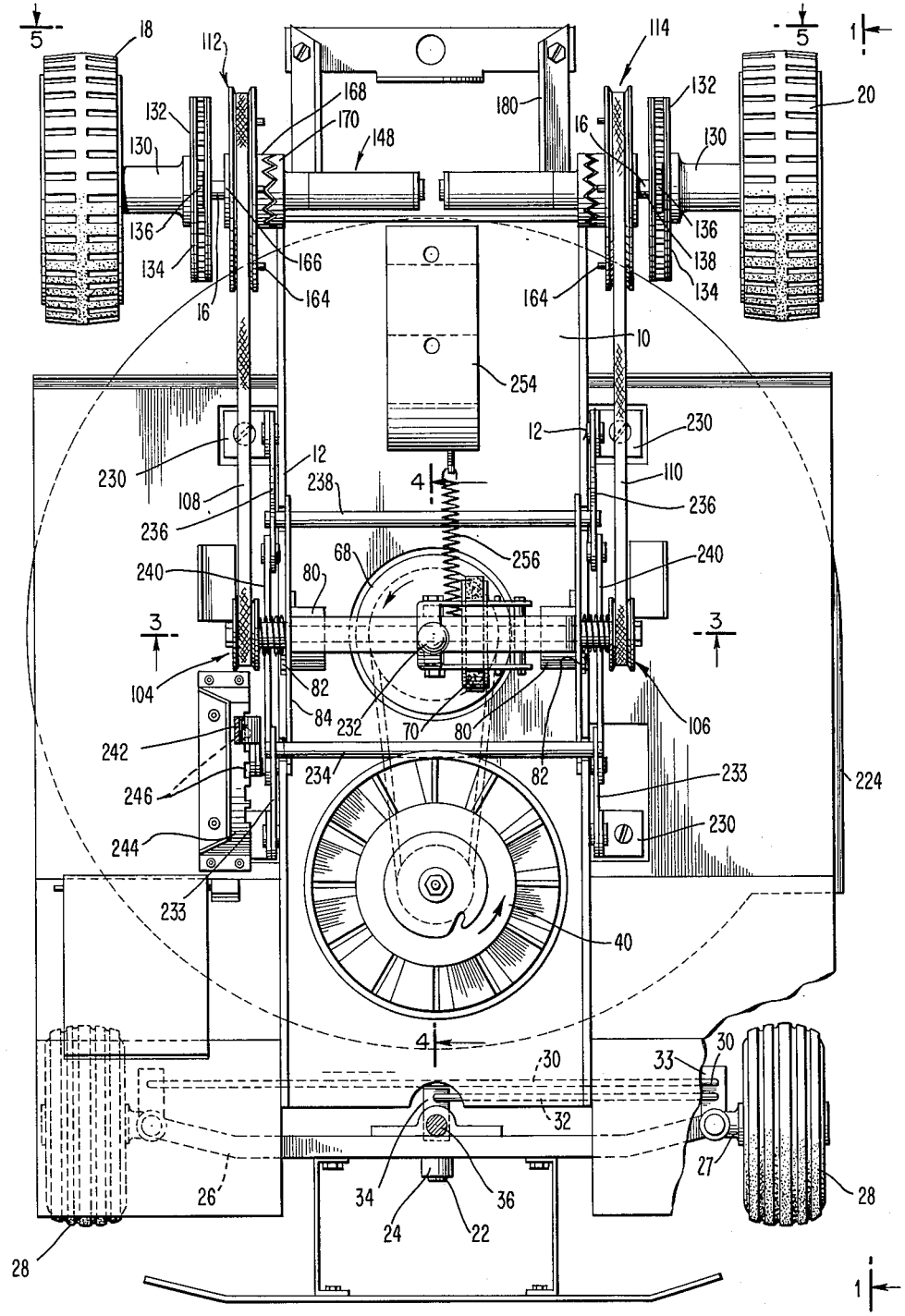
FIG. 2 is a plan view partially in horizontal longitudinal section.

The car to which the invention has been applied is in this instance of the type adapted to carry the operator and while its use is mainly as a mower, it is useable also as a light tractor with the mower temporarily not in operation.

As illustrated in the drawings, the machine has a deck 10 formed integrally with up-turned side flanges 12 extending substantially the length of the car. A deck 11 parallel to deck 10 is welded to flanges 12 and gives rigidity to the frame so formed. At the rear are provided a pair of brackets 14 extending below deck 10 for supporting an axle 16 upon which are rotatably mounted a pair of driving wheels 18 and 20. At the front of deck 10 is mounted a forwardly extending pivot 22 for a bearing 24 suitably attached to a front axle 26 at the ends of which are pivotally supported spindles 27 for steerable front wheels 28. Steering is accomplished by manipulation of a handle bar 38 mounted upon a vertical steering column 36 provided with an arm 34 having a drag link 32 connected with an arm 33 on the spindle of one of the front wheels 28. A tie bar 30 transmits steering motion of one front wheel 28 to the other.

Forwardly on deck 10 is mounted a motor of any suitable type indicated at 40 having a base 42 bolted to deck 11 by suitable capscrews 44. The motor 40 has a vertical shaft 46 extending through decks 10 and 11 and provided at its end with a centrifugal clutch 48 held thereon by suitable nut 50. The centrifugal clutch 48 may be of any suitable description and as it is well known in the art it is not described herein in detail. It is, however, provided with pulley 52 to receive a drive belt 54 passing over a pulley 56. As will be noted, pulleys 52 and 56 are of the sprocket variety for engagement with the chain type belt 54 since the drive pulley 52 is of relatively small diameter and better gripping on belt 54 is thus obtained.

Pulley 56 forms part of a transmission assembly which has a hollow housing 58 screwed to deck 10 and supports spaced apart anti-friction bearings 60 and 62 for a hollow vertical shaft 64 upon the threaded upper end of which pulley 56 is mounted. On the upper face of pulley 56 is attached by means of suitable capscrews 66 a friction disk 68 which is thus adapted to rotate with its horizontal face facing upwardly to engage a rubber drive wheel 70.

The speed of rotation of drive wheel 70 will vary with its location with respect to the center of rotation of drive disk 68, and means for varying this location is provided. To this end, drive wheel 70 is mounted between a pair of circular disks 72 provided centrally with a hub 74 having a hexagonal aperture 75 to slidingly engage a horizontal hexagonal shaft 76 rotatably mounted on a yoke shaped frame 78 and longitudinally slidable thereon at suitable bearings 80. Yoke frame 78 is mounted on pivots 82 eccentric to bearings 80 and supported by brackets 84 bolted to flanges 12. Bolt holes shown at 86 (FIG. 8) are provided for this purpose.

To slide friction drive wheel 70 longitudinally of shaft 76 there is mounted on hub 74 a block 88 freely rotatable thereon and provided with pins 90 engaging a forked shaped lever 92 at its slotted ends 94. Lever 92 is pivotally mounted at bosses 96 provided centrally of yoke 78 by means of screws 98. Forked lever 92 extends upwardly and is provided with a handle portion 100 which is provided at its upper end with a ball 102 adapted to be grasped by the operator for manual manipulation.

By reference to FIG. 8 it will be seen that pushing against ball 102 in the forward direction has the effect of raising friction drive wheel 70 from driving disk 68 while sidewise motion of lever 96 will vary the position of drive wheel 70 with respect to the face of driving disk 68 not only to vary the relative speeds of these two elements with respect to each other by varying the distance of the point of contact therebetween from the center of drive disk 68 but in addition to vary the direction of rotation of drive wheel 70 as it passes the center of drive disk 68.

The transmission above described is adapted to supply power for propelling the mower through driving wheels 18 and 20. For this purpose shaft 76 is provided with a pair of pulleys 104 and 106 mounted at opposite ends of that shaft. By means of belts 108 and 110 pulleys 104 and 106 are connected to pulleys 112 and 114, respectively, which are adapted to drive wheels 18 and 20 respectively.

Pulleys 104 and 106 are so constructed that if the pull of the belts on those pulleys varies with respect to each other, the effective diameters of the pulleys will change accordingly. For instance if the pull of the belt 108 on pulley 104 becomes greater, the effective diameter of the pulley is automatically reduced. To this end each pulley 104 and 106 is composed of an outer disk 116 rigidly attached to the shaft 76 by a bolt 118, and an inner disk 120 slidable longitudinally on shaft 76 but adapted to be rotated thereby. The inner faces 122 and 124 of disks 116 and 120 respectively are tapered to conform to the sides of the V-belts 108 and 110. Disks 116 and 120 are resiliently pressed toward each other by a coil spring 126 bearing against inner disk 120 and the adjacent face of bearing 80. As the left disk of pulley 104 (FIG. 3) is connected by the shaft 76 to the right disk of pulley 106, it will be evident that if the forces acting to separate disks 116 and 120 are greater on pulley 104 than the corresponding forces acting on pulley 106, shaft 76 will slide longitudinally to separate the corresponding disks 116 and 120, effecting a smaller effective driving diameter of pulley 104. It will be evident that the same effect can be produced on pulley 106 when the pull on belt 110 is greater than that on 108.

Each of drive wheels 18 and 20 is provided with a hub 130 rotatable on axle 16 and on each hub 130 is mounted a relatively large sprocket 132 connected by means of a chain 134 to a smaller sprocket, 136. Each sprocket 136 is mounted on its individual shaft 138 which is supported for rotation by a two piece bracket 140. The lower portion 142 of bracket 140 has a hub like portion 144 encircling axle 16 to be swingable thereon formed integrally with an upwardly extending flange 146 by which it is attached to the upper portion 148 of bracket 140. Portion 148 likewise has a flange portion 150 adapted to lie flat against flange 146 and bolted thereto by a pair of suitable bolts 152 threaded into flange 150 and passing through elongated slots 154 in flange 146 thus providing means for adjusting the length of bracket 140. Portion 148 of bracket 140 is also provided with a hub like portion 156 to receive shaft 138.

Pulleys 112 and 114, which are alike in all respects, each comprise a pair of disks 160 and 162 facing each other with tapered inner faces to engage the V-type belts 108 and 110. Disks 160 and 162 can move toward and away from each other on shaft 138 but are caused to rotate together by suitable pins 164, which are fixed to one disk and slide in holes in the other. The spacing of disks 160 and 162 with respect to each other depends upon the torque transmitted by the pulley to the shaft 138. Outer disk 160 abuts a plate 166 fixed on shaft 138. The inner disk 162 is provided with a hub with cam member 168 engaging a complementary cam member 170 fixed to rotate with shaft 138. Each of the cam members 168 and 170 has a plurality of complemental cam surfaces which are inclined so that relative angular movement of the cam members causes axial separation of the cam members and thereby pushes the axially slidable pulley disk 162 toward disk 160 to increase the effective diameter of the pulley. The cam surfaces on cam members 168 and 170 are symmetrical so as to act in the same manner in both forward and reverse drive.

The torque responsive drive provided by the cam members 168 and 170 in cooperation with the rest of the transmission system provides differential action for turning while providing positive drive for both drive wheels in the event one loses traction. When the vehicle is moving straight ahead, the cam members are normally closed and both rear pulleys are open as illustrated in FIG. 6. If the vehicle is turned toward the right, the resulting greater torque on the right rear wheel causes the cam members of the right rear pulley 114 to open thereby closing the right rear pulley and increasing its effective diameter. The closing of the right rear pulley increases the tension on the right belt 110 causing it to open the right front pulley 106 by moving the outer disk 116 to the right and thereby decreases its effective diameter. As the disk 116 is fixed to the floating hexagonal shaft 76, the shaft and disk 116 of the opposite pulley are also moved to the right to close the left front pulley 104. The changes thus effected in the diameters of the pulleys cause the right rear wheel to be driven more slowly than the left rear wheel to compensate for the difference in turning radius.

Although a differential action is thus provided it will be seen that both wheels are at all times positively driven. Hence, if one wheel is on slippery ground or is out of contact with the ground, the opposite wheel is positively driven with increased torque. Moreover, under conditions requiring more torque, for example when going uphill, both rear pulleys are partially or wholly closed by the action of the torque responsive cam members. The resulting belt tension causes both front pulleys to open against the action of springs 126. The transmission is thereby shifted automatically to a lower gear.

V-belts and pulleys are subject to some wear and it is therefore desirable to have a means to initially and periodically adjust for tightness. In this instance such an adjustment is afforded by brackets 180 adjacent the flange portion 146 of bracket 140. Brackets 180 are provided with quadrant slots 182 to receive capscrews 184 passing into bosses 186 formed integrally with flange 146. Adjustment of the tension in the drive V-belts 108 and 110 is made by suitably swinging bracket 140 about axle 16 to take up slack in the belt and then setting the screws 184 to clamp the bracket in that position.

Figure 4:
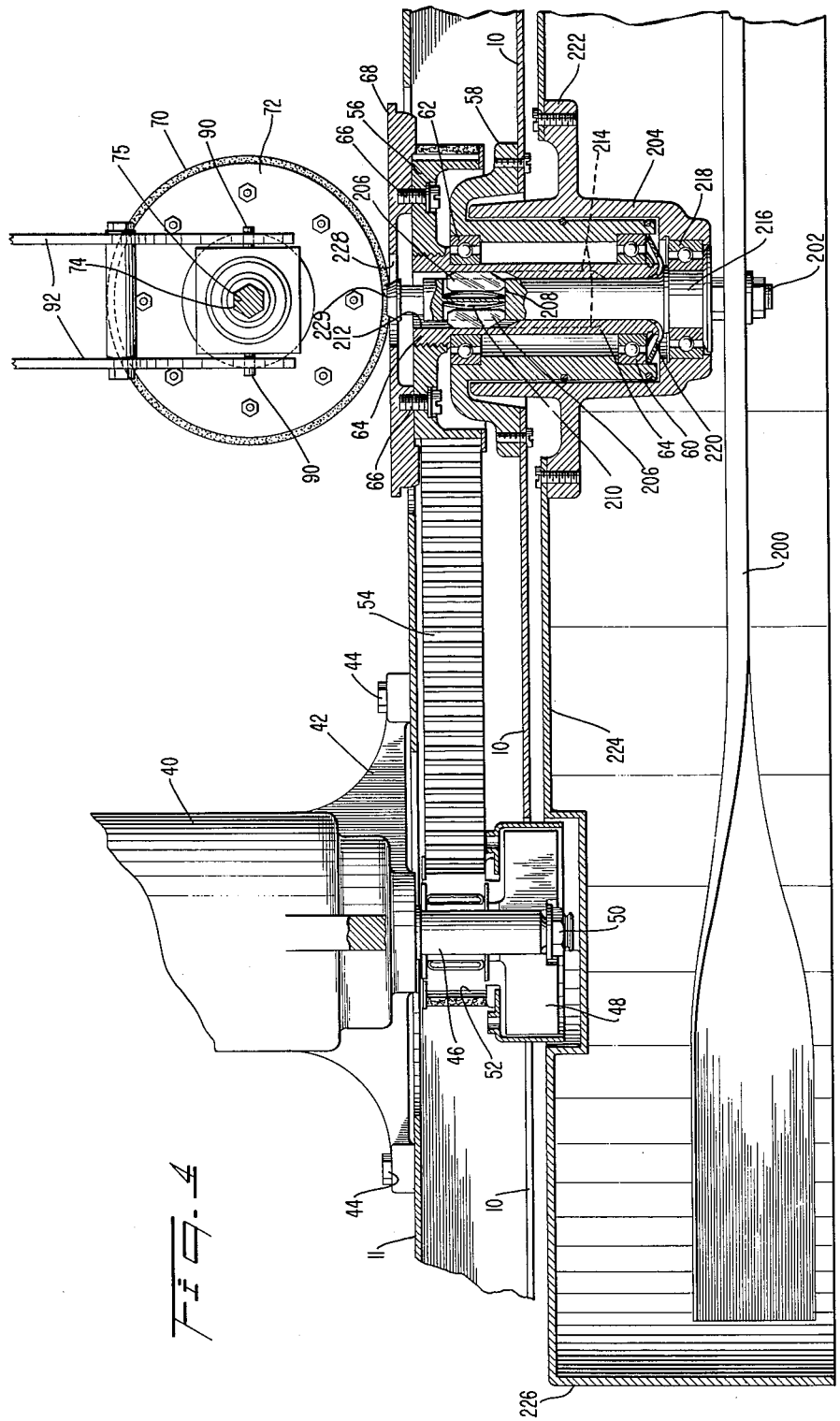
FIG. 4 is a longitudinal vertical section taken along the line 4—4 of FIG. 2 looking in the direction of the arrows.

The transmission above described is adapted to actuate a rotary cutting blade 200 mounted on a vertical shaft 202 extending upwardly into the hollow shaft 64 to be driven thereby (FIG. 4). Shaft 202 is provided with a housing 204 slidable vertically and longitudinally upon the outer surface of housing 58 for adjustment of the height of blade 200 with respect to the ground below. Shaft 202 is adapted to be clutched and declutched from shaft 64 and for this purpose is provided with a pair of keys 206 resiliently pressed outward in a slot 208 in shaft 202 by a pair of bowed springs 210. In the uppermost position of shaft 202 within shaft 64, keys 206 are adapted to rotate freely as the portion of the hollow shaft 64 at that location is cylindrical, as shown at 212. Below such cylindrical portion, however, the interior or shaft 64 is provided with flutes 214 for engagement with keys 206 to couple shaft 202 rotationally with shaft 64. Keys 206 are tapered at their ends so that they can withdraw into slot 208 preparatory to registry with flutes 214.

Shaft 202 is provided with a head 216 carrying antifriction bearings 218 by which it is held in position on housing 204. Interposed between head 216 and bearing 60 at its outer face is provided a Belleville type spring 220 which acts as a brake for shaft 202 when in its uppermost position compressing spring 220.

Housing 204 is provided with a flange 222 upon which is suitably screwed a blade guard 224 extending circularly beyond the extremities of blade 200 and having a conventional downturned outer edge 226 for protective purposes.

As shown in FIG. 4 the end of shaft 202 is adapted to extend upwardly through a central aperture 228 in the face of friction disk 68 and slightly above that surface, as indicated at 229. This provides a rest as well as a brake for friction wheel 70 when in the central position on shaft 76.

Means is provided to raise guard 224 for adjustment of the heigth of blade 200. To this end guard 224 is provided with a pair of hangers opposite sides shown at 230. Each hanger 230 extends upwardly and is provided with a pin 232 to engage a linkage assembly including a front bell crank 233 pivoted on the web 12 on the pin 234 and a rearward dog 236 pivoted on a pin 238 on web 12 but reversed as to forward bell crank 233. Bell crank 233 is connected to bell crank 236 by a link 240 so that upward motion of hangers 230 will equalize. Manual control of raising of guard 224 is provided by a lever 242 having a pivotal mounting 244 on shaft 234, and engaging pin 232. A cutting height selector bracket 244 is provided with notches 246 to engage lever 242 for holding the guard 224 and cutting blade 200 at various heights of cut.

For seating the operator a bracket 250 is provided mounted on plate 11, a saddle or suitable seat 252 being attached to bracket 250 by a spring support 254. Spring member 254 provides an anchor for a suitable spring 256 attached to frame 78 by which friction wheel 70 is held in contact with friction plate 68.

A suitable housing 258 encloses the working parts of the machine and provides a panel 260 through which control lever 100 projects. Suitable notches in panel 260 as shown in FIG. 8 are adapted to act as a guide for control lever 100 and insure that as lever 100 is passed from one notch to another lever 100 must be pressed forward to disengage friction wheel 70 from disk 68. In the central position as described above friction wheel 70 when released will engage shaft end 229 acting as a brake to hold the machine stationary.

Drive wheels 18 and 20 are adapted to be disconnected from their hubs 130. As shown in FIG. 5 hubs 130 are rotatively connected with propelling wheels 18 and 20 by a spring pressed plunger passing through wheel flanges 272 and into a hole in an eccentrically disposed portion 274 formed integrally with hub 130. Plunger 270 is withdrawn manually by pulling on a knob 276 attached to plunger 270 and accessible from the outside of propelling wheel 18.

The method of operating the machine is clear from the above description. After wheeling the machine to a suitable location for starting motor 40, pins 270 are released by the knob 276 to engage their hubs 130 whereby they are coupled with the driving mechanism. Motor 40 is then started in conventional manner while control lever 100 is in the neutral position with friction wheel 70 in its central position on pin 232. As soon as engine 40 is warmed up and its speed reduced to idling, maneuvering of the machine is then in order. Centrifugal clutch 48 does not engage pulley 52 with the drive shaft 46 until the engine is speeded up. Control lever 100 is then manipulated to a position corresponding to a suitable speed either forward or reverse as desired in which position friction wheel 70 is engaged by friction disk 68. When the vehicle has been propelled to a suitable spot for mowing the engine speed may be reduced at which point the centrifugal clutch 48 will again disengage. The operator will then by means of lever 242 release the braking spring 220 and by lowering the cutting guard 224 bring shaft 202 into engagement with hollow shaft 64 at which position keys 206 come into engagement with flutes 214 of shaft 64. Upon increase of motor speed, centrifugal clutch 48 engages to drive, through chain belt 54, the transmission parts including friction disk 68 and shaft 64 whereupon blade 200 revolves to provide cutting action desired and the car is propelled forwardly or backwardly as desired. The speed of the car is regulated mainly by control of the positioning of friction wheel 70 with respect to friction disk 68 and speed of the cutting blade 200 is merely dependent upon the speed of rotation of motor 40.

Through the differential action of pulleys 104 and 106 and their corresponding driven pulleys 112 and 114 power is applied to wheels 18 and 20 as required for turning and at suitable relative speeds, and even though one wheel is lifted clear of the ground the other will provide power and traction.

While a preferred embodiment of the invention has been shown in the drawing and particularly described, it will be understood that the invention is not limited to this embodiment.

What we claim and desire to secure by Letters Patent is:

1. A self-propelled mowing machine comprising a chassis, and engine mounted on the chassis, wheels supporting said chassis including a pair of driving wheels, a transmission, a drive shaft driven by said transmission having a pair of driving pulleys automatically adjustable as to effective driving diameter, a pair of pulleys belt driven by said first pulleys and automatically adjustable as to effective diameter and each drivingly connected to one of said driving wheels, said transmission having a vertical hollow shaft, a housing for said shaft supported stationary on said chassis and provided with shaft bearings, a cutting blade shaft extending into said hollow shaft and adapted to clutch said hollow shaft, a housing for said blade shaft having bearings therefor and longitudinally slidable on the first said housing, and means to adjust the relative positions of said housings with respect to each other.

2. A self-propelled mowing machine as set forth in claim 1 in which said hollow shaft is provided with internal flutes for a portion of its length and said blade shaft has resiliently mounted members to engage said flutes.

3. A self-propelled mowing machine as set forth in claim 1 in which said hollow shaft is provided with a smooth cylindrical bore for a portion of its length and a bore of lesser diameter communicating with the first said bore and the smaller bore being fluted, said blade shaft having a key to engage the fluted bore and to disengage said hollow shaft at the larger bore.

4. A self-propelled mowing machine as set forth in claim 1 in which said hollow shaft is provided with a smooth cylindrical bore for a portion of its length and a bore of lesser diameter communicating with the first said bore and the smaller bore being fluted, said blade shaft having a key to engage the fluted bore and to disengage said hollow shaft at the larger bore, said key being resiliently mounted to withdraw into said blade shaft.

5. A self propelled machine comprising a chassis, wheels supporting said chassis including a pair of driving wheels, an engine mounted on the chassis, a drive shaft extending transversely of the chassis, driving connections between said engine and said drive shaft, a first pair of laterally spaced V-belt pulleys on said drive shaft and driven thereby, each of said pulleys comprising two halves designated as a left half and a right half respectively, said halves being rotatable together and movable axially toward and away from one another to vary the effective diameter of the pulley, means operatively interconnecting the left half of one pulley with the right half of the other pulley so that when the effective diameter of one of said pulleys is increased the effective diameter of the other of said pulleys is correspondingly decreased, a second pair of V-belt pulleys rotatable about a stationary axis parallel to said shaft, belts driving said second pulleys from said first pulleys, each of said second pulleys comprising two halves rotatable together and movable axially toward and away from one another to vary the effective diameter of the pulley, the engagement of said belts with said second pulleys tending to separate said pulley halves and thereby decrease the effective diameter of said pulleys, and driving connections between said second pulleys and said driving wheels comprising torque responsive means for pressing together the halves of each of said second pulleys to increase the effective diameter of said pulley on increase of torque, whereby greater torque on one driving wheel, as when the vehicle is turning, causes an increase in the effective diameter of the respective second pulley which acts through the respective belt to cause a decrease in the effective diameter of the respective first pulley which acts through said interconnecting means to cause an increase in the effective diameter of the other of said first pulleys, thereby producing a differential driving speed ratio between said engine and said driving wheels.

6. A machine according to claim 5, in which said torque responsive means comprises two rotary double acting cam members coaxial with each second pulley, one of said cam members being operatively connected with the respective driving wheel and the other of said cam members being operatively connected with and axially movable with a half of said second pulley, said cam members having interengaging cam surfaces for moving said pulley half toward the other half of said pulley upon rotary movement of said cam members relative to one another.

7. A machine according to claim 5, in which the driving connections between said engine and said drive shaft comprise a rotatable friction disk driven by the engine and disposed with its axis of rotation normal to said drive shaft and a friction roller axially slidable on and rotatable with said drive shaft and in driven engagement with said friction disk.

8. A machine according to claim 7, further comprising manual control means for moving said roller along said drive shaft and radially of said disk to vary the speed ratio between the engine and said drive shaft.

9. A machine according to claim 8, further comprising a frame rotatably supporting said drive shaft for movement toward and away from said disk and means for moving said frame and drive shaft to disengage said roller from said disk.

10. A self propelled machine comprising a chassis, wheels supporting said chassis including a pair of driving wheels, an engine mounted on the chassis, a floating drive shaft extending transversely of said chassis, means supporting said shaft for rotation and axial movement, driving connections between said engine and shaft, a first pair of V-belt pulleys on said shaft and driven thereby, each of said pulleys comprising two halves designated as a left half and a right half, said halves being movable toward and away from one another to vary the effective diameter of the pulley, the left half of one pulley and the right half of the other pulley being fixed on said shaft while the other half of each of said pulleys is rotatable with but axially slidable relative to said shaft, means positioning said other halves of said pulleys relative to said supporting means, a second pair of V-belt pulleys, each comprising two halves movable axially toward and away from one another to vary the effective diameter of the pulley, V-belts driving said second pulleys from said first pulleys and independent driving connections between each of said second pulleys and said driving wheels respectively including torque responsive means for pressing the halves of the respective second pulley toward one another to increase the effective diameter of said pulley on increase of torque, whereby greater torque on one driving wheel as when the vehicle is turning causes an increase in the effective diameter of the respective second pulley which acts through the respective belt to separate the halves of the respective first pulley to decrease the effective diameter of said first pulley and shift said floating drive shaft axially to move the halves of the other first pulley toward one another and thereby increase the effective diameter of said other first pulley, thereby producing a differential driving speed ratio between said engine and said driving wheels.

11. A machine according to claim 10, in which said positioning means comprises balanced helical springs coaxial with said shaft and acting between said supporting means and said second halves of the first pulleys.

12. A machine according to claim 10, in which the driving connections between the engine and said shaft comprise a rotatable friction disk driven by the engine and disposed with its axis of rotation normal to said drive shaft and a friction roller axially slidable on and rotatable with said drive shaft and in driving engagement with said disk.

13. A self propelled machine comprising a chassis, wheels supporting said chassis including two driving wheels, an engine mounted on said chassis, a rotatable drive shaft extending transversely of said chassis, driving connections between said engine and said shaft, a first pair of laterally spaced V-belt pulleys on said drive shaft and driven thereby, each of said pulleys comprising two halves designated as a left half and a right half respectively, the left half of one pulley and the right half of the other pulley being fixed on said shaft while the other half of each pulley is rotatable with but axially slidable on said shaft, means yieldably urging said other pulley halves toward the first mentioned halves, a second pair of V-belt pulleys each comprising two halves rotatable together and movable axially relative toward and away from one another to vary the effective diameter of the pulley, V-belts driving said second pulleys from said first pulleys, and independent driving connections between each of said second pulleys and said driving wheels respectively including cooperating rotary cam members coaxial with each second pulley, one of said cam members being operatively connected with the respective driving wheel and the other of said cam members being rotatable and axially movable with one half of said second pulley, said cam members having interengaging cam surfaces for moving said one pulley half toward the other half of said second pulley upon rotary movement of said cam members relative to one another to increase the effective diameter of said second pulley.

14. A self-propelled mowing machine comprising a chassis, wheels supporting said chassis including a pair of driving wheels, an engine mounted on the chassis, a vertical hollow shaft rotatably supported on said chassis, driving connections between said hollow shaft and engine, a friction disk fixed on the upper end of said hollow shaft and having a horizontal friction surface, a horizontal drive shaft spaced upwardly from said disk and extending transversely of said chassis with the axis of said drive shaft approximately intersecting the axis of said hollow shaft, means rotatably supporting said drive shaft, a roller axially slidable on and rotatable with said drive shaft, said roller being engageable with and driven by said disk, a pair of pulleys on opposite end portions of said drive shaft, driving connections between said pulleys and said driving wheels, control means for moving said roller along said drive shaft between positions on one side of the center of said disk to provide forward drive speeds, a neutral position central of said disk and at least one reverse position on the opposite side of the center of said disk, a cutting blade shaft extending into said hollow vertical shaft, a cutting blade mounted on the lower end of said cutting blade shaft, means for moving said cutting blade shaft vertically with respect to said hollow shaft to vary the vertical position of said blade relative to the chassis and means providing a driving connection between said hollow shaft and said cutting blade shaft when said blade is in a lower position and disconnecting said cutting blade shaft from said hollow shaft when said blade is in a raised position.

15. A self-propelled mowing machine according to claim 14, in which said disk has a central aperture and in which means is provided for restraining rotation of said cutting blade shaft when in raised position and brake means on said cutting blade shaft is disposed in said aperture and is engageable with said roller when in neutral position to restrain rotation of said roller and thereby restrain rotation of said drive wheels.

16. A self propelled machine comprising a chassis, wheels supporting said chassis including a pair of driving wheels, an engine mounted on said chassis, a first pair of V-belt pulleys rotatable about an axis extending transversely of said chassis, each of said pulleys comprising two halves rotatable together and movable axially toward and away from one another to vary the effective diameter of the pulley, means yieldably urging said halves toward one another to increase the effective diameter, driving connections between said engine and said pulleys, a second pair of V-belt pulleys rotatable about an axis parallel to the axis of said first pair, each of said second pulleys comprising two halves rotatable together and movable axially toward and away from one another to vary the effective diameter of the the pulley, V-belts driving said second pulleys from said first pulleys, independent driving connections between each of said second pulleys and said driving wheels respectively including torque responsive means for pressing the halves of the respective second pulley toward one another to increase the effective diameter of said pulley on increase of torque, whereby greater torque resistance of one driving wheel causes an increase in the effective diameter of the respective second pulley which acts through the associated belt to move the halves of the respective first pulley to decrease the effective diameter of said first pulley and thereby vary the speed ratio at which said wheel is driven.

17. A machine according to claim 16 in which said driving connection between the engine and first pulleys comprises means for reversing the direction of drive of said pulleys and in which said torque responsive means is double acting to tend to increase the effective diameter of the respective second pulley upon increase of torque in both directions of drive.

References Cited in the file of this patent

UNITED STATES PATENTS

| | | |
|---|---|---|
| 190,622 | Rittenberry | May 8, 1877 |
| 696,596 | Robinson | Apr. 1, 1902 |
| 889,679 | Hatfield | June 2, 1908 |
| 1,135,938 | Hedges | Apr. 13, 1915 |
| 1,279,547 | Hueber | Sept. 24, 1918 |
| 2,420,100 | Salsbury | May 6, 1947 |
| 2,878,690 | Capron et al. | Mar. 24, 1959 |
| 2,888,114 | Bostock | May 26, 1959 |
| 2,927,480 | Schweickart | Mar. 8, 1960 |